United States Patent Office 3,634,388
Patented Jan. 11, 1972

3,634,388
BIS-(N-ACYLAMINO-PHTHALIMIDE)-DISAZO
DYESTUFFS
Walter Horstmann, Cologne, Dietmar Kalz, Leverkusen, Gerhard Wolfrum, Opladen, and Edgar Siegel, Leverkusen, Germany, assignors to Farbenfabriken Bayer AG, Leverkusen, Germany
No Drawing. Filed Nov. 26, 1968, Ser. No. 779,239
Claims priority, application Germany, Dec. 6, 1967, P 16 44 238.9
Int. Cl. C09b 33/02
U.S. Cl. 260—152  2 Claims

ABSTRACT OF THE DISCLOSURE

Sulfonic acid group-free disazo dyestuffs are prepared which are valuable pigment dyestuffs characterized by good fastness to light, solvents and migration, and by a good thermal resistance when used for coloring papers, lacquers, varnishes and synthetic materials and for the production of pigment paste and printing inks. The dyestuffs correspond to the general formula

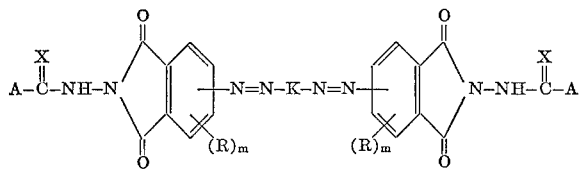

wherein A stands for an optionally substituted alkyl, aralkyl, carbocyclic or heterocyclic radical or for the radical

where $R_1$ and $R_2$, independently of one another, represent hydrogen, an optionally substituted alkyl, aralkyl or aryl radical; X stands for an oxygen or sulfur atom or for NH; K stands for the radical of a bifunctional coupling component; R stands for a substituent; and $m$ is an integer from 0 to 3.

---

The object of the present invention relates to valuable new sulphonic acid group-free disazo dyestuffs of the general formula

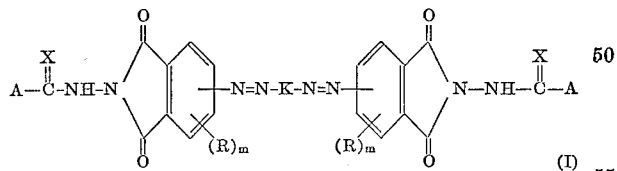 (I)

and to a process for their production.

In Formula I A stands for an optionally substituted alkyl, aralkyl, carbocyclic or heterocyclic radical or for the radical

where $R_1$ and $R_2$, independently of one another, represent hydrogen, an optionally substituted alkyl, aralkyl or aryl radical, X stands for an oxygen or sulphur atom or for NH, K stands for the radical of a bifunctional coupling component, R stands for a substituent, and $m$ is an integer from 0–3.

Suitable alkyl radicals A are, for example, branched and unbranched $C_1$–$C_8$ alkyl radicals, such as methyl, ethyl, propyl, isopropyl or butyl radicals.

Suitable aralkyl radicals are especially benzyl radicals, such as

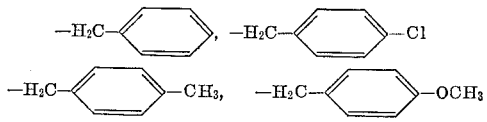

Suitable carbocyclic radicals are especially optionally substituted aryl radicals, particularly phenyl radicals or naphthyl radicals, such as

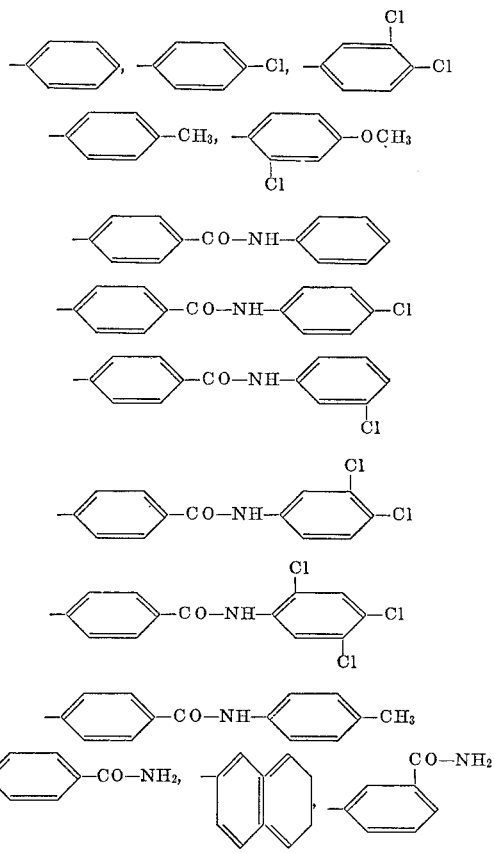

or cycloalkyl radicals, such as cyclohexyl radicals.

Suitable heterocyclic radicals are, for example,

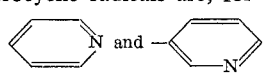

and suitable radicals

are, for example, —NH$_2$, —NHCH$_3$, —NHC$_2$H$_5$ and

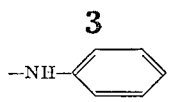

Substituents R to be especially mentioned are alkyl groups, such as methyl, ethyl and butyl groups; halogen atoms, such as fluorine, chlorine and bromine; alkoxy groups, such as methoxy and ethoxy groups; nitro groups and trifluoromethyl groups.

Suitable radicals —K— are, for example, the radicals of N,N' - arylene - bis-[2'-hydroxynaphthoyl-(3-)-amides], N,N'-arylene-bis-acetoacetylamides, arylene - bis-[3-methyl-pyrazolon-(5)-yles-(1)] and arylene-bis-[3-methyl-5-amino-pyrazoles-(1)] of the formula

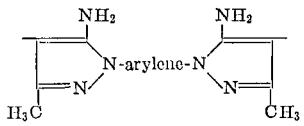

The new disazo dyestuffs of the Formula I are obtained by reacting disazo compounds of the formula

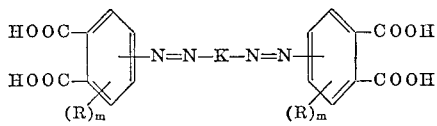

in which K, R and $m$ have the same meaning as above, or their functional derivatives, for example dianhydrides, semiesters or neutral esters, in a molar ratio 1:2 in high-boiling organic solvents, optionally in the presence of condensing agents, with compounds of the formula

in which A and X have the same meaning as above, and selecting the starting components free from sulphonic acid groups.

One group of particularly valuable dyestuffs within the range of the dyestuffs of the Formula I is obtained by reacting disazo dyestuffs of the formula

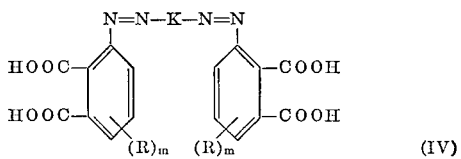

in which K, R and $m$ have the same meaning as above, or their dianhydrides, semiesters or neutral esters with compounds of the Formula III which yield disazo dyestuffs of the formula

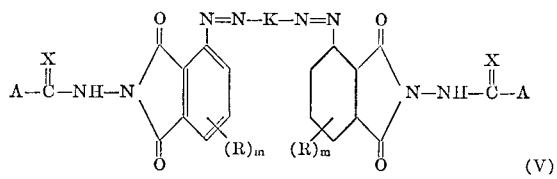

Especially preferred dyestuffs are those of the formula

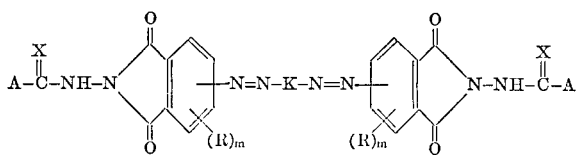

where

X is selected from the group consisting of O, S, and NH;
$m$ is an integer from 0 to 3;
R is selected from the group consisting of alkyl with 1–4 carbon atoms, fluorine, chlorine, bromine, methoxy, ethoxy, nitro and trifluoromethyl;

A is selected from the group consisting of alkyl with 1–8 carbon atoms; cyclohexyl; phenyl; phenyl substituted by a member Cl, $CH_3$, $CONH_2$, or $NHOCCH_3$; benzyl, benzyl substituted by a member Cl, $CH_3$ or $OCH_3$; naphthyl, pyridyl; carbanilino phenylene; carbanilino phenylene substituted by a member Cl or $CH_3$, benzoylamino phenylene; benzoylamino phenylene substitued by a member Cl or $CH_3$; or A is a radical

where $R_1$ and $R_2$ are selected from the group consisting of H; methyl, ethyl and phenyl; and K is selected from the group consisting of N,N'-arylene-bis[2'-hydroxy-naphthoyl(3'-)-amide], N,N' - arylene-bis[acetoacetylamide], N,N' - arylene-bis[3-methyl-pyrazolone(5)yle(1)], N,N'-arylene-bis[3-methyl-5-amino-pyrazole(1)], where arylene is a bivalent radical selected from the group consisting of

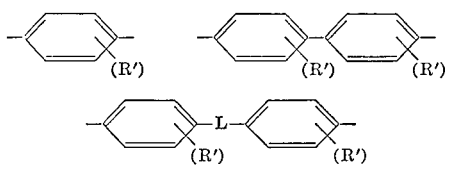

where L is $CH_2$, O, CH=CH, NHCONH; and
R' is H, Cl or $CH_3$.

The starting dyestuffs of the Formula II or their functional derivatives are obtained in conventional manner by diazotising the optionally substituted aminophthalic acids or their functional derivatives and coupling with bifunctional coupling components. The following diazo components may be used for this purpose, for example:

3- and 4-aminophthalic acid,
3-amino-phthalic acid dimethyl ester,
3-amino-6-methyl-phthalic acid,
3-amino-5-nitro-phthalic acid,
3-amino-6-methoxy-phthalic acid,
3-amino-4-methoxy-phthalic acid,
3-amino-6-chloro-phthalic acid,
3-amino-5,6-dimethoxy-phthalic acid,
4-amino-3-chloro-phthalic acid,
4-amino-5-chloro-phthalic acid,
4-amino-phthalic acid dimethyl ester,
4-amino-3-methyl-phthalic acid,
4-amino-5-methyl-phthalic acid,
4-amino-3-methoxy-phthalic acid,
4-amino-5-methoxy-phthalic acid and
4-amino-3,6-dichloro-phthalic acid.

As bifunctional coupling components H-K-H there may be used, for example:

N,N'-bis-(3'-hydroxy-naphthoyl-(2'))-phenylene-diamine-1,4,
N,N'-bis-(3'-hydroxy-naphthoyl-(2'))-2-chloro-phenylene-diamine-1,4,
N,N'-bis-(3'-hydroxy-naphthoyl-(2'))-4'',4''-diamino-diphenyl,
N,N'-bis-(3'-hydroxy-naphthoyl-(2'))-3'',3''-dimethyl-4'',4''-diamino-diphenyl,
N,N'-bis-(3-hydroxy-naphthoyl-(2'))-2'',2''-dichloro-4'',4''-diamino-diphenyl,
N,N'-bis-(3'-hydroxy-naphthoyl-(2'))-4'',4''-diamino-diphenyl-methane,
N,N'-bis-(3'-hydroxy-naphthoyl-(2'))-4'4,4''-diamino-diphenyl ether,
N,N'-bis-(3'-hydroxy-naphthoyl-(2'))-2,5-dimethyl-phenylene-diamine-1,4,
N,N'-bis-(3'-hydroxy-naphthoyl-(2'))-4'',4''-diamino-stilbene, N,N'-bis-(3'-hydroxy-naphthoyl-(2))-4''',4'''-diamino-
diphenyl-urea,
N,N'-bis-(acetoacetyl)-phenylene-diamine-1,4,
N,N'-bis-(acetoacetyl)-2,5-dichlorophenylene-
diamine-1,4,
N,N-bis-(acetoacetyl)-2,5-dimethyl-phenylene-
diamine-1,4,
N,N'-bis-(acetoacetyl)-2-chloro-phenylene-
diamine-1,4,
N,N'-bis-(acetoacetyl)-2-methyl-phenylene-
diamine-1,4,
N,N'-bis-(acetoacetylamine)-biphenylene-4,4',
N,N'-bis-(acetoacetylamino)-3,3'-dimethyl-biphenyl-
ene-4,4',
N,N'-bis-(acetoacetylamino)-2,2'-dichloro-bi-
phenylene-4,4',
N,N'-bis-(acetoacetylamino)-3,3'-dichloro-biphenyl-
ene-4,4',
N,N'-bis-(acetoacetyl)-4,4'-diamino-diphenylmethane-
phenylene-1,4-bis-(3'-methyl-pyrazolone-(5')-yl-(1')),
phenylene-1,4-bis-(3'-methyl-5'-amino-pyrazolyl-(1')),
biphenylene-4,4'-bis-(3''-methyl-5''-amino-pyrazolyl-
(1'')),
biphenylene-4,4'-bis-(3''-methyl-pyrazolon-(5'')-
yl-(1'')),
(3,3'-dimethyl-biphenylene-(4,4'))-bis-(3''-methyl-
pyrazolon-(5'')-yl-(1'')),
(3,3'-dimethyl-biphenylene-(4,4'))-bis(-3''-methyl-5''-
amino-pyrozolyl-(1'')).

Compounds (III) suitable for the production of azo
dyestuffs of the Formula I are, for example: semicar-
bazide, thiosemicarbazide, aminoguanidine and their sub-
stitution products, e.g.

4-methylsemicarbazide,
4-phenylsemicarbazide,
4-benzylsemicarbazide,
4-cyclohexylsemicarbazide,
4,4-dimethylsemicarbazide,
4-methyl-thiosemicarbazide,
4-phenyl-thiosemicarbazide,
4-benzylthiosemicarbazide,
4-cyclohexylthiosemicarbazide,
4,4-dimethylthiosemicarbazide,
N-amino-N'-methyl-guanidine,
N-amino-N'-phenyl-guanidine,
N-amino-N'-cyclohexyl-guanidine, or
N-acetylhydrazine,
propionic acid hydrazide,
phenyl-acetic acid hydrazide,
4-chloro-phenyl acetic acid hydrazide,
benzoic acid hydrazide,
4-chloro-benzoic acid hydrazide,
3,4-dichloro-benzoic acid hydrazide,
4-methyl-benzoic acid hydrazide,
4-methoxy-benzoic acid hydrazide,
4-carbanilino-benzoic acid hydrazide,
4-(4'-chloro-carbanilino)-benzoic acid hydrazide
4-(3',4'-dichloro-carbanilino)-benzoic acid hydrazide,
4-(2',4',5'-trichloro-carbanilino)-benzoic acid hydrazide,
4-(4'-methyl-carbanilino)-benzoic acid hydrazide,
4-carbamido-benzoic acid hydrazide,
cyclohexane-carboxylic acid hydrazide,
naphthoic acid-2-hydrazide,
naphthoic acid-1-hydrazide,
nicotinic acid-hydrazide,
isonicotinic acid hydrazide,
4-(2',5'-dichloro-carbanilino)-benzoic acid hydrazide,
4-acetylamino-benzoic acid hydrazide,
4-benzoyl-amino-benzoic acid hydrazide,
4-(4'-chloro-benzoylamino)-benzoic acid hydrazide,
4-(4'-methyl-benzoylamino)-benzoic acid hydrazide,
2,5-dichloro-4-carbamido-benzoic acid hydrazide,
3-carboxamido-benzoic acid hydrazide,
3-carboxamido-4-chloro-benzoic acid hydrazide.

Organic solvents suitable for the condensation of the
monoazo dyestuff (II) or (IV), or their derivatives with
the compounds (III) are the following solvents which
boil above 80° C., for example: benzene, toluene,
xylenes, chlorobenzene, o-, m-, p-dichlorobenzene, tri-
chlorobenzenes, quinoline, nitrobenzene, glacial acetic
acid, cyclohexane, 1,2,3,4 - tetrahydro-naphthalene,
naphthalene, tetrachloroethylene, anisole, diphenyl ether,
di-n-butyl ether, Decalin, and mixtures of such solvents.
Preferred condensing agents which are concurrently to
be used are, for example: acidic, water-eliminating
agents, such as formic acid, acetic acid, propionic acid,
anhydrous sodium acetate, zinc chloride, iron(III)
chloride, aluminum chloride and boron trifluoride.

The reaction of (II) or of the corresponding dianhy-
drides, semiesters or esters with the compounds (III) is
performed in a molar ratio of about 1:2. In general, the
operation is carried out with an excess of 10–20% of the
component (III) in order to achieve a reaction of (II)
as complete as possible. Dependent upon the use of ideni-
tical or different compounds (III), symmetric or asym-
metric dyestuffs of the Formula I are obtained.

The products obtainable according to the present proc-
ess are valuable new pigment dyestuffs which are gen-
erally characterised by good fastness to light, to solvents
and to migration as well as by a good heat resistance in
the various substrates. They are used for the colouring
of paper, lacquers and synthetic materials, such as, e.g.,
plasticiser-containing polyvinyl chloride, polyethylene
and acrylonitrile/butadiene/styrene co- and graft-poly-
mers, and for the production of pigment pastes and print-
ing inks.

The parts in the following examples are parts by weight,
the temperatures are given in degrees centigrade.

EXAMPLE 1

7 parts of the disazo dyestuffs obtained from 2 mol
diazotised 3-amino-phthalic acid and 1 mol N,N'-bis-
(acetoacetyl)-2,5-dichloro - phenylene - diamine-1,4 and
3.2 parts cyclohexane carboxylic acid hydrazide are
heated at 120° for 4 hours in a mixture of 225 parts o-
dichlorobenzene and 25 parts glacial acetic acid; the barely
soluble pigment is filtered off with suction while hot,
washed with 200 ml. hot o-dichlorobenzene and 100 ml.
benzene and dried at 50° in a vacuum. 7.5 parts of a light-
fast, greenish yellow pigment dyestuff of the formula

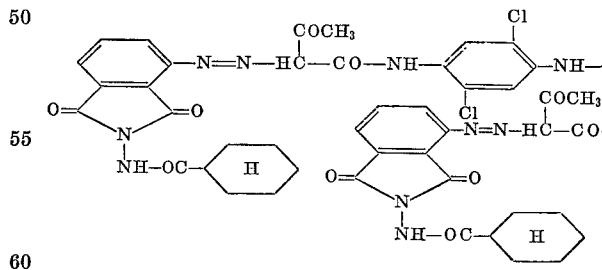

are obtained.

EXAMPLE 2

8.3 parts of the disazo dyestuff obtained from diazotised
3-aminophthalic acid and N,N'-bis-[2-hydroxynaphthoyl-
(3)-amino]-phenylene-1,4 are heated at 110–120° for 2
hours in a mixture of 200 parts o-dichlorobenzene and
20 parts glacial acetic acid; 6 parts 3,4-dichloro-benzoic
acid hydrazide are then added and the mixture is kept at
120° for 10 hours, the product is then filtered off with
suction while hot, washed with 200 ml. hot o-dichloro-
benzene and dried in a vacuum until the weight is con-
stant. The yield amounts to 11 parts of a red pigment
dyestuff of the formula

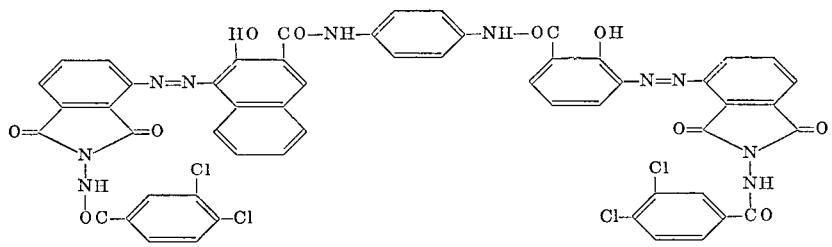

When the procedure given in the above examples is followed but, instead of the diazo, coupling and imidation components (III), those set out in the following table are used, valuable pigment dyestuffs with the specified shades are likewise obtained.

| Diazo component | Coupling component | Imidation component | Shade |
|---|---|---|---|
| 3-amino-phthalic acid | N,N'-bis-[2'-hydroxy-naphthoyl-(3')]-phenylene-diamine-1,4. | Semicarbazide | Red. |
| Do | do | Thiosemicarbazide | Red. |
| Do | do | Aminoguanidine | Red. |
| Do | do | 4-chloro-benzoic acid-hydrazide | Red. |
| Do | do | 4-(4'-chloro-carbanilino)-benzoic acid hydrazide | Red. |
| Do | do | Cyclohexane-carboxylic-acid-hydrazide | Red. |
| Do | N,N'-bis-[2'-hydroxy-naphthoyl-(3')]-2-chloro-phenylene-diamine-1,4. | Semicarbazide | Red. |
| Do | do | Thiosemicarbazide | Red. |
| Do | do | 4-chloro-benzoic acid-hydrazide | Red. |
| Do | do | 4-(4'-chloro-carbanilino)-benzoic acid-hydrazide | Red. |
| Do | do | Cyclohexane-carboxylic acid-hydrazide | Red. |
| Do | N,N'-bis-[2'-hydroxy-naphthoyl-(3')]-4'',4'''-diamino-diphenyl. | Thiosemicarbazide | Red. |
| Do | do | 4-chloro-benzoic acid-hydrazide | Red. |
| Do | do | 4-carbanilino-benzoic acid-hydrazide | Red. |
| 4-amino-phthalic acid | do | Semicarbazide | Red. |
| Do | do | 4-carboxamido-benzoic acid-hydrazide | Red. |
| Do | do | 4-(2',4',5',-trichloro-carbanilino)-benzoic acid-hydrazide. | Red. |
| Do | N,N'-bis-[2'-hydroxy-naphthoyl-(3')]-phenylene-diamine-1,4. | Semicarbazide | Red. |
| Do | do | 4-benzoylamino-benzoic acid-hydrazide | Red. |
| Do | do | 4-(4'-chloro-carbanilino)-benzoic acid-hydrazide | Red. |
| 3-amino-phthalic acid | N,N'-bis-(acetoacetyl)-2,5-dichloro-phenylene-diamine-1,4. | Semicarbazide | Yellow. |
| Do | do | Thiosemicarbazide | Do. |
| Do | do | Amino-guanidine | Do. |
| Do | do | 2-chloro-benzoic acid hydrazide | Do. |
| Do | do | 4-methyl-benzoic acid-hydrazide | Do. |
| Do | do | 4-carbanilino-benzoic acid-hydrazide | Do. |
| Do | do | 2-acetylamino-benzoic acid-hydrazide | Do. |
| Do | do | Semicarbazide | Do. |
| Do | do | 4-chloro-benzoic acid-hydrazide | Do. |
| Do | do | 4-carboxamido-benzoic acid-hydrazide | Do. |
| Do | do | 4-(4'-chloro-carbanilino)-benzoic acid-hydrazide | Do. |
| 3-amino-phthalic acid | N,N'-bis-(acetoacetyl)-2,5-dimethyl-phenylene-diamine-1,4. | Semicarbazide | Do. |
| Do | do | Cyclohexane-carboxylic acid-hydrazide | Do. |
| Do | do | 2-chloro-benzoic acid-hydrazide | Do. |
| Do | do | 4-methyl-benzoic acid-hydrazide | Do. |
| Do | do | 4-carboxamido-benzoic acid-hydrazide | Do. |
| Do | N,N'-bis-(acetoacetyl)-2-methyl-5-chloro-phenylene-diamine-1,4. | Semicarbazade | Do. |
| Do | do | 4-chloro-benzoic acid-hydrazide | Do. |
| Do | do | 4-methyl-benzoic acid-hydrazide | Do. |
| Do | do | Cyclohexane-carboxylic acid-hydrazide | Do. |
| Do | Phenylene-4,4'-bis-[3''-methyl-pyrazolon-(5'')-yl-(1'')]. | Semicarbazide | Do. |
| Do | do | Cyclohexane-carboxylic acid-hydrazide | Do. |
| Do | do | 4-chloro-benzoic acid-hydrazide | Do. |
| Do | do | 4-carboxamido-benzoic acid-hydrazide | Do. |
| 4-amino-5-methoxy-phthalic acid | N,N'-bis-[2'-hydroxy-naphthoyl-(3')]-phenylene-diamine-1,4. | Semicarbazide | Red. |
| Do | do | 4-chloro-benzoic acid-hydrazide | Do. |
| Do | N,N'-bis-(acetoacetyl)-2,5-dichloro-phenylene-diamine-1,4'. | Cyclohexane-carboxylic acid-hydrazide | Yellow. |
| Do | do | 4-carbanilino-benzoic acid-hydrazide | Do. |

We claim:
1. Sulfonic acid group-free disazo dyestuffs of the formula

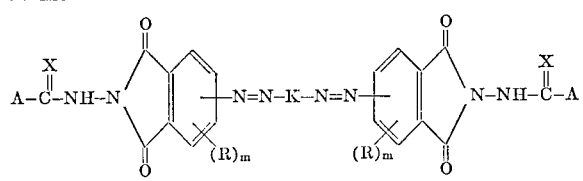

where:

X is selected from the group consisting of O, S, and NH;
$m$ is an integer from 0 to 3;
R is selected from the group consisting of alkyl with 1–4 carbon atoms, fluorine, chlorine, bromine, methoxy, ethoxy, nitro and trifluoromethyl;
A is selected from the group consisting of alkyl with 1–8 carbon atoms; cyclohexyl; phenyl; phenyl substituted by a member Cl, $CH_3$, $CONH_2$, or $NHOCCH_3$; benzyl, benzyl substituted by a member Cl, $CH_3$ or $OCH_3$; naphthyl, pyridyl; carbanilino phenylene; carbanilino phenylene substituted by a member Cl or $CH_3$, benzoylamino phenylene; benzoylamino phenylene substituted by a member Cl or $CH_3$; or
A is a radical

where $R_1$ and $R_2$ are selected from the group consisting of H; methyl, ethyl and phenyl; and K is selected from the group consisting of N,N'-arylene-bis[2'-hydroxy-naphthoyl-(3') - amide], N,N'-arylene-bis[acetoacetyl-amide], N,N'-arylene - bis[3 - methyl-pyrazolone (5)yle(1)], N,N'-arylene - bis[3 - methyl-5-amino-pyrazole(1)], where arylene is a bivalent radical selected from the group consisting of

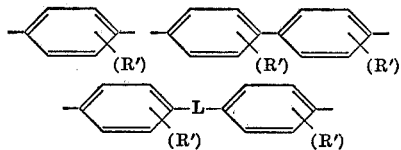

where L is $CH_2$, O, CH=CH, NHCONH; and R' is H, Cl or $CH_3$.

2. Sulphonic acid group-free disazo dyestuffs of claim 1 of the formula

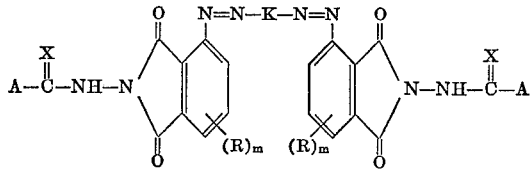

References Cited

FOREIGN PATENTS 6,701,983  9/1967  Netherlands _____ 260—152

HENRY R. JILES, Primary Examiner

D. M. PAPUGA, Assistant Examiner

U.S. Cl. X.R.

106—22, 228; 117—138.8, 154; 260—156, 160